United States Patent Office 2,836,507
Patented May 27, 1958

2,836,507

NON-BRITTLE, NON-LUSTROUS, OXIDATION RESISTANT ASPHALT

Edwin J. Barth, New York, N. Y.

No Drawing. Application March 5, 1957
Serial No. 643,950

2 Claims. (Cl. 106—232)

It is well known to asphalt, paving technologists and engineers that the bituminous binder or asphalt (bitumen) in pavements and in roofing products deteriorate over a span of years to a marked degree.

Such deterioration is evidenced by road pavement break-up and in roofing felts, shingles, roof-coatings, and the like. In fact, all asphalts whether used in roads, roofings, or for water-proofing lose with time their original resilience, softness and especially their adhesion the latter property of adhesion being the prime requisite for having used bitumens i. e. asphalts.

Road deterioration is, as commonly known, seen in the sand, stone or other inorganic or mineral aggregate breaking-up under traffic and forming holes, cavities and erosion spots. The rain, snow and traffic are the ultimate factors to this attrition, and complete failure of the road-way. Loss of adhesion appears to be the underlying cause of this break-up of the road-way since the asphalt film, the binder on the stone or sand aggregate no longer cements the stone sand grains together.

Similarly, in roofing products exposed also to the elements and often on inclined surfaces we find over the course of a few years, serious felt or shingle break-down exposing the roof below through small and then larger areas of dried out crumbly shingle felt, devoid of all adhesive bitumen.

The cause of this lack of adhesion is in all instances initiated and continuously maintained by a slow but constant rate of oxidation of the bituminous binder. We find as catalysts for this oxidation reaction that sunlight and water are quite efficient in accelerating the process of deterioration.

This deterioration results in loss of adhesiveness. Water eventually tends to wash away the water-soluble organic acids that form in the oxidation process exposing fresh new surface to the air, i. e. the oxidizing agent. Asphalts that are sensitive to sunlight are known as photo-sensitive bitumens. Some are so sensitive that the ductility test conducted in direct sunlight will effect this property and shorten the thread of the asphalt being pulled out in the testing machine.

All asphalts are composed of three physical groups of hydrocarbons, the asphaltenes, the resins, and the oils. The properties of all asphalts or bitumens are almost wholly dependent upon the state of solution of these three groups in one another, or how well the asphaltenes are dispersed in the oils, the dispersion medium by the group called resins, i. e. the peptizers or asphaltene stabilizers.

Where all these hydrocarbons are in partial to complete solution in one another, we have a first state or a colloidal system called a sol, which as is well known to rheologists has the quality of being tremendously adhesive.

In other bitumen, also well known and extensively used we find the asphaltenes have a larger particle size, and are in greater amount and are fairly well dispersed in the oils and are sufficiently adhesive for general use purposes, though rheological tests indicate the presence of a lessened degree of adhesivity than in the case of the sol condition described above. This is the sol-gel or second state.

The third or gel state is encountered in asphalts that are purposely "blown" in their manufacture in order to produce roofing asphalt of a rubbery nature in order to be non-susceptible to roofing or hot sun temperatures and to stay-put on a slanting roof.

In the gel group we have a composition having a high asphaltene content and quite often the asphaltenes are coarsely or ill dispersed in a somewhat deficient amount of resin peptizers and thus yield a rubbery asphalt. This condition produces a material of low adhesive properties.

Road or roof deterioration of asphalts appears, as already mentioned, to be due to a lack of adhesivity of the binder thereby allowing stones, sand, etc. in the road-way to loosen and result in pavement break-up.

It is believed from many tests made by asphalt chemists on bitumens extracted from new, aged and old pavements that an extensive oxidation takes place. This results in a continual and then final deterioration caused over the years in a bitumen of a sol nature wherein the asphaltene content has increased and the resin content has diminished with loss of stickiness so that the composition lacks balance, adhesion and the proper amount of soft plasticizing oils which were originally present.

The deteriorated road asphalt has therefore over the years assumed a lowered degree of adhesivity found in many artificially oxidized or blown asphalts. In summary, in the table below are presented three rheologically different types of asphalts and their colloidal composition. In this table P. I. stands for the penetration index done according to the Shell method and the melting point is done by the ring and ball procedure.

| Colloid Type or State | Sol | Sol-Gel | | Gel | |
|---|---|---|---|---|---|
| Rheological type | Newtonian (Calif.) | Visco-elastic | | Elastic | |
| | | Mexican | Venezuela | Blown Venezuela | Blown Mexican |
| Asphaltenes | 4.6 | 22 | 16 | 20 | 30.4 |
| Resins | 59.0 | 34 | 35 | 26 | 17.6 |
| Oils | 36.4 | 44.0 | 49 | 54 | 52.0 |
| Ductility at 77° F. cm | over 150 | 76 | 100 | 12 | 5.1 |
| P. I. | —1.6 | 0.0 | —0.8 | 3.5 | 4.1 |
| Melting Point, °C | 55 | 57 | 56 | 50 | 89 |

Those versed in the art will note in the above table that the gel type shows a very low ductility with a generally relatively high asphaltene content in proportion to the resin content.

The gel asphalts also lack a coherent fluidity at the melting point; instead they show a stiff plastic structure which is often found to be of a friable nature in the cold.

Asphalt technologists use the ductility test as an indicator of good adhesion. However, I use the ductility test as a measure to indicate how well the hydrocarbons are dispersed in one another, a low ductility test indicating at once an unstable condition in the bitumen and this is directly related to adhesiveness.

As seen from the above table, we have a low penetration index for a sol type asphalt high in ductility, an average Mexican and straight run Venezuelan asphalt showing —0.8 to 0.0 penetration index hence good ductility, while the two gel asphalts that were blown show the high penetration index of 3.5 and 4.1 for 12 and 5.1 cm. ductility respectively.

The lack of a clear asphaltene dispersion or homogeniety results in low ductility since the hydrocarbon groups are no longer unified.

I have found substances and materials which preserve in bitumens the adhesive properties so desirable for obtaining excellent ductility and penetration index.

The penetration index is an arbitrary scale of numbers correlating the relationship of melting point and penetration done at 77° F. as formulated by Pfeiffer and Van Doormal (Proceedings International Association of Testing Materials, London, Cong. 1937, page 504).

A high concentration of asphaltenes to resins gives a high penetration index. A zero penetration index indicates a well balanced adhesive asphalt, which may be as low as —1 or —1.8 or thereabout. A high penetration index such as 2.0, 3.0 or over indicates an oxidized material or "blown" asphalts of high asphaltene content, reduced resin content, low ductility and lack of adhesivity.

To relate the tendency of bitumens to age on the road to a laboratory accelerated ageing test, I employ a test called, thin-film ageing test. This laboratory test which is simple to perform is that described by Pauls and Welborn, Public Roads, vol. 27, No. 9, August 1953. In this test 50 milliliters of sample are exposed in flat tins or containers of 5.5 inches in diameter at a bitumen depth of about ⅛ inch for periods of 5, 8, 12 or 24 hours depending upon how drastic the test is to be.

In this thin film ageing test the asphalt is heated in a controlled electrically heated oven with free access of air at 325° F. and is made of the two constants of an asphalt, namely the penetration index at 77° F. and the ductility at 77° F. To determine the penetration index by Van Doormal's method, I determine the penetration at 77° F. and the melting point and calculate the penetration index (P. I.).

A Mexican soft asphalt will show a zero penetration index, blown asphalts over 1.0 to about 7 to 8, suspectible asphalts below 0, and cracked asphalts and coal tar pitches below —1 to as low as —4 or —5.

It is one of my objects to prevent the bitumen in a pavement, for example, for oxidizing over a period of years.

It is also my objective to add to the asphalt, prior to the start of the deterioration action of the elements, a substance that will hinder to a great extent the increase in asphaltene concentration as evidenced by a high P. I. and by low ductility. The latter two properties go hand in hand though I prefer to consider the ductility of an asphalt to be a more sensitive indicator of deep seated degradation changes going on in a bitumen.

It is also my objective to supply to the bitumen a solubilizer for maintaining or for restoring the peptizing action of the resins and for solubilizing the asphaltene to a high degree of dispersion.

It is also my objective to simultaneously supply to the asphalt composition an anti-oxidant to act upon the oily constituents of the bitumen, i. e. the naphthenic and paraffinic hydrocarbons. My anti-oxidants prevent formation of organic acid by oxidation. These acids are oil soluble electrolytes and act as precipitants to the asphaltenes tending to yield coarse or unstable asphaltene dispersions in the acidic composition.

The material I have discovered which prevents to a large degree this oxidation, i. e. asphaltene increase as evidenced by high penetration index and low ductility, in short which prevents bitumen deterioration in asphalt pavements and asphalt roofs on exposure to the elements over long periods of time, is an aromatic oil, containing high boiling alkylated cresols and to a lesser extent the guaiacols, condensed aromatics, etc, and known in commerce as pine tar of medium and heavy grade. These pine tars are free of suspended carbon and contain large amounts of aromatics and polar compounds and they are 100 percent soluble in alcohol. In addition these pine tar products contain terpenes of high solvent power, resin acids and fluid terpene pitch-like condensates capable of exerting anti-oxidant action.

Pine tar has the following established specification:

|  | Medium Pine Tar, i. e. type K | Heavy Pine Tar, i. e. type L |
|---|---|---|
| Specific Gravity at 15° C | 1.070–1.075 | 1.075–1.080. |
| Moisture Content | Trace | Trace. |
| Flash Point (Open Cup) | 257° F | 265° F. |
| Acidity (As Acetic Acid) | 0.1% Maximum | 0.1% Maximum. |
| Viscosity (Stormer 30° C.) | 5–10 Mins., 150 Grams | 16–20 Mins., 150 Grams. |
| Acid Number | 60 | 60. |
| Color | Golden Brown | Golden Brown. |
| Solubility in Benzol | 99.5% | 99.5%. |
| Pounds per gallon (15° C.) | 8.9 | 9. |
| Gals. in 100 pounds (15° C.) | 11.24 | 11.11. |
| Representative Distillation: |  |  |
| IBP | 172° C | 204° C. |
| 5% | 221° C | 222° C. |
| 10% | 241° C | 247° C. |
| 20% | 272° C | 284° C. |
| 30% | 309° C | 315° C. |
| 40% | 328° C | 334° C. |
| 50% | 338° C | 348° C. |
| 60% | 350° C | 350° C. |
| 80% |  | 355° C. |

Another type of pine tar (type M) commercially available in medium to extra heavy grades and which I use has the following characteristics:

|  | Medium |
|---|---|
| Specific gravity at 15.5/15.15° C | 1.056. |
| Absolute viscosity centipoises at 30° C | 2100. |
| Acid number | 51. |
| Moisture | Not more than 2% by volume. |
| Flash point (open cup) | 260° F. |
| Ash | 0.1%. |
| Distillation, A. S. T. M. D20–30 apparatus: |  |
| 5% volume | 222° C. |
| 10% volume | 238° C. |
| 50% volume | 338° C. |
| 75% volume | 352° C. |
| 80% volume |  |

*Correlation of thin film oven test with road record of extracted bitumens.*—R. Vokac, at the Montana National Bituminous Conference, September 1939, gave tests on extracted asphalts from pavements up to 14 years old which gave good to bad performance. Table I shows the tests on the extracted asphalts.

TABLE I

| Type | A' | B' | C' |
|---|---|---|---|
| Average age in years | 10 | 9 | 14. |
| Average Original Penetration | 49 | 51 | 55. |
| Average Penetration of recovered asphalt | 18 | 29 | 39. |
| Average ductility of recovered asphalt | 6 | 40 | 70. |
| Average softening Point of recovered asphalt | 178° F | 148° F | 142° F. |
| Penetration Index | 2.3 | 0.7 | 0.6. |
| Pavement Condition | cracked | sound | shoved. |

Lewis (Accelerated Durability Testing of Bituminous Material, 52nd annual meetings, A. S. T. M., July 1949, Spec. Tech. Public. No. 94, page 35), indicates that the 7 hour thin film test at 325° F. coincides with tests of an extracted bitumen from road ways of about 10 years old:

|  | Pent., 77° F. | Duct., 77° F. | ° F., M. P. | P. I. |
|---|---|---|---|---|
|  |  | Cm. |  |  |
| 7 hr. Thin Film Test (⅛″ thick) | 28 | 14 | 150.9 | 0.9 |
| Extracted asphalt from 10 year pavement | 27 | 15 | 149 | 0.7 |

The purpose of this invention is to secure the highest possible ductility and with the least possible increase in penetration index by the addition of specific materials called pine tar antioxidants. These materials are pine tars derived by distillation of pine stumps, pine wood, and similar woods of the nature of pine wood from the turpentine making and like industries.

Two examples of my asphalt compositions are given below: Bachaguero (Venezuelan) vacuum asphalt i. e. (A), the other a Baxterville, Mississippi vacuum asphalt, i. e. (B). The physical constants of these asphalts are:

|  | A | B |
|---|---|---|
| Penetration, 77° F | 76 | 96. |
| Melting Point (R. & B.) | 118° F. | 120° F. |
| Ductility at 77° F | 100 plus cm. | 100 plus cm. |
| Soluble in CS₂ | 99.91% | 99.98%. |
| Flash point, open cup | 565° F | 520° F. |
| Penetration Index (Shell Method) | −0.8 | 0.2. |

In order to simulate the results of the Lewis values in the seven hour accelerated durability test described above, some of my asphalt compositions were exposed for eight hours at 325° F. in the ⅛ inch film thickness test instead of for seven hours. This procedure made the test more severe than that of the seven hour Lewis method.

In the case of asphalt B the thin film test was run for 10 hours at 325° F. in order to obtain an appreciable hardening effect.

In Tables II and III below my composition blends are shown using asphalt A and B respectively and the pine tar types described above.

TABLE II

*Eight hour thin film test at 325° F. with asphalt A*

| Pine Tar Additive |  | Type K | Type L | Type M |
|---|---|---|---|---|
| Percentage added |  | none | 1 | 1.75 | 0.75 |
| Penet. at 77° F |  | 33 | 38 | 38 | 36 |
| M. P. (R. & B.) | ° F | 154 | 144 | 145 | 144 |
| Penetration Index (Shell) |  | 1.5 | 0.8 | 0.9 | 0.7 |
| Ductility, 77° F | cm | 18 | 33 | 57 | 42 |
| Penet. at 77° F. Before running the Eight hour Test |  | 76 | 82 | 78 | 100 |

TABLE III

*Ten hour thin film test at 325° F. with asphalt B*

| Pine Tar Additive, Type |  | K | L |  |
|---|---|---|---|---|
| Percent Added |  | none | 1.0 | 0.75 | 1.5 |
| Pent. 77° F |  | 53 | 52 | 54 | 61 |
| M. P. (R. & B.) | ° F | 142 | 137 | 134 | 130 |
| Pent. Index |  | 1.4 | 0.8 | 0.6 | 0.4 |
| Ductility at 77° F. in cm |  | 36 | 65 | 60 | 75 |
| Pent. before Test |  | 96 | 100 | 100 | 106 |

It is seen from Tables II and III above that high boilings pine tar oils exert a marked anti-deterioration effect on these two asphalts used in industry.

The effect of pine tar addition is most marked in the solubilizing power of the pine tar additive on the asphalt hydrocarbons when disturbed by oxidation. This oxidation normally produces a low ductility material of 18 and 36 cm. respectively for asphalt A and B. But the solubilizing and anti-oxidant effect of pine tar additions results in an increased and very satisfactory ductility for asphalt A and B compositions containing pine tar. Furthermore a relatively low increase in the melting point over that of the unblended asphalt at a given penetration is obtained, again indicating less disturbance by oxidation of the asphaltene dispersion in the asphalt thereby producing a more homogeneous and longer life asphalt. For instance where asphalt A and B would normally show signs of cracking in a ten to twenty year period in the pavement, the addition of pine tars greatly increases the pavement life-span from two to three fold.

Clearly this invention is of a generic nature and is not to be limited to the pine tars used for illustrative purposes, nor is it to be limited by any theory. What is certain is that the addition of pine tars to asphalts yields compositions which have much longer useful lives than asphalts having no pine tar therein, thereby maintaining the new asphalt compositions in substantially their original physical condition for a much longer time than when no pine tar is added to the asphalt or bitumen. Bitumen is but another name for asphalt.

The amount of pine tar useable is 0.1 to 5.0 percent or more but preferred results are obtained with asphalt composition containing from 0.5 to 1.5 percent pine tar. And while pine tars are preferred, other wood tars, for example from the wood distillation industry or tars from the coal tar industry are operable.

The asphalts useable are preferably obtained from the petroleum industry, but asphalts and bitumens obtained from other sources are also operable.

In the making of asphalt roads on the average about 10 percent asphalt is used with about 90 percent sand and/or aggregate. However, this amount may vary somewhat from the average value of 10 percent depending on the location of the road, weight of traffic, etc.

In the preparation of roofing material, the web of cellulosic or other fibers is saturated with the inventive asphalt composition containing pine tar.

I claim:

1. A non-brittle, non-lustrous, oxidation resistant asphalt composition of matter for road paving capable of solubilizing asphaltenes as they are formed comprising asphalt and 0.1 to 5.0 percent by weight of alcohol soluble pine tar containing substantially no free carbon.

2. The composition of claim 1 wherein the amount of pin tar varies from 0.5 to 1.5 percent by weight.

References Cited in the file of this patent

UNITED STATES PATENTS

| 564,975 | Dean | Aug. 4, 1896 |
| 569,854 | Cotter et al. | Oct. 20, 1896 |
| 1,492,408 | Ullrich | Apr. 29, 1924 |
| 1,603,502 | Alexander | Oct. 19, 1926 |
| 1,972,055 | Richter | Aug. 29, 1934 |
| 2,427,488 | Anderson et al. | Sept. 16, 1947 |

FOREIGN PATENTS

| 23,981 | Great Britain | of 1895 |
| 577,639 | France | Sept. 8, 1924 |

OTHER REFERENCES

Abraham Asphalt and Allied Substances, 5th ed. 1945, pp. 326–328, 580–581, and chart between 2 p.